(12) United States Patent
Huang et al.

(10) Patent No.: US 11,256,082 B2
(45) Date of Patent: Feb. 22, 2022

(54) LENS MODULE AND ELECTRONIC DEVICE USING SAME

(71) Applicant: TRIPLE WIN TECHNOLOGY (SHENZHEN) CO. LTD., Shenzhen (CN)

(72) Inventors: Chun-Yao Huang, New Taipei (TW); Cheng-An Lin, New Taipei (TW)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 282 days.

(21) Appl. No.: 16/564,167

(22) Filed: Sep. 9, 2019

(65) Prior Publication Data

US 2021/0041686 A1     Feb. 11, 2021

(30) Foreign Application Priority Data

Aug. 6, 2019   (CN) .......................... 201910723216.3

(51) Int. Cl.
*G02B 26/08*   (2006.01)
*G02B 7/02*    (2021.01)

(52) U.S. Cl.
CPC ......... *G02B 26/0833* (2013.01); *G02B 7/023* (2013.01)

(58) Field of Classification Search
CPC ...... G02B 26/0833; G02B 7/023; G02B 7/08; G02B 7/021; G02B 7/04; G03B 21/14
USPC .................................................. 359/223.1
See application file for complete search history.

(56) References Cited

U.S. PATENT DOCUMENTS

| | | | |
|---|---|---|---|
| 2007/0040921 A1* | 2/2007 | Davis ..................... | H04N 5/372 348/305 |
| 2018/0041668 A1* | 2/2018 | Cui .......................... | G03B 3/00 |
| 2019/0179107 A1* | 6/2019 | Hsu .......................... | G02B 7/04 |

FOREIGN PATENT DOCUMENTS

| | | |
|---|---|---|
| CN | 102854725 A | 1/2013 |
| TW | 201201077 A | 1/2012 |
| TW | 201821895 A | 6/2018 |

* cited by examiner

*Primary Examiner* — Euncha P Cherry
(74) *Attorney, Agent, or Firm* — ScienBiziP, P.C.

(57) ABSTRACT

A lens module includes a voice coil motor, a lens received in the voice coil motor, a light emitting element adapted for emitting lights, a prism, and a DLP sensor. The prism faces and inclines towards the light emitting element. The prism is configured to reflect the lights from the light emitting element to the DLP sensor. The voice coil motor is configured to automatically adjust a distance between the lens and the DLP sensor according to a sharpness of the pattern and send electronic signals to the DLP sensor. When the DLP sensor receives the electronic signals, the DLP sensor rotates to change states of the DLP sensor according to the electronic signals and control an amount of the lights reflected into the lens according to the electronic signals thereby forming a pattern with a higher degree of sharpness than the pattern previously captured.

18 Claims, 5 Drawing Sheets

LENS MODULE AND ELECTRONIC DEVICE USING SAME

FIELD

The subject matter of the application generally relates to lens module.

BACKGROUND

Lens modules are essential in a face recognition technology. With the rapid development of the face recognition technology, the application of the lens modules is becoming wider. Conventional lens modules cannot form various types pattern when lights from the lens modules are projected on an object, so the conventional lens modules lack the flexibility to meet varied demands.

Thus, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
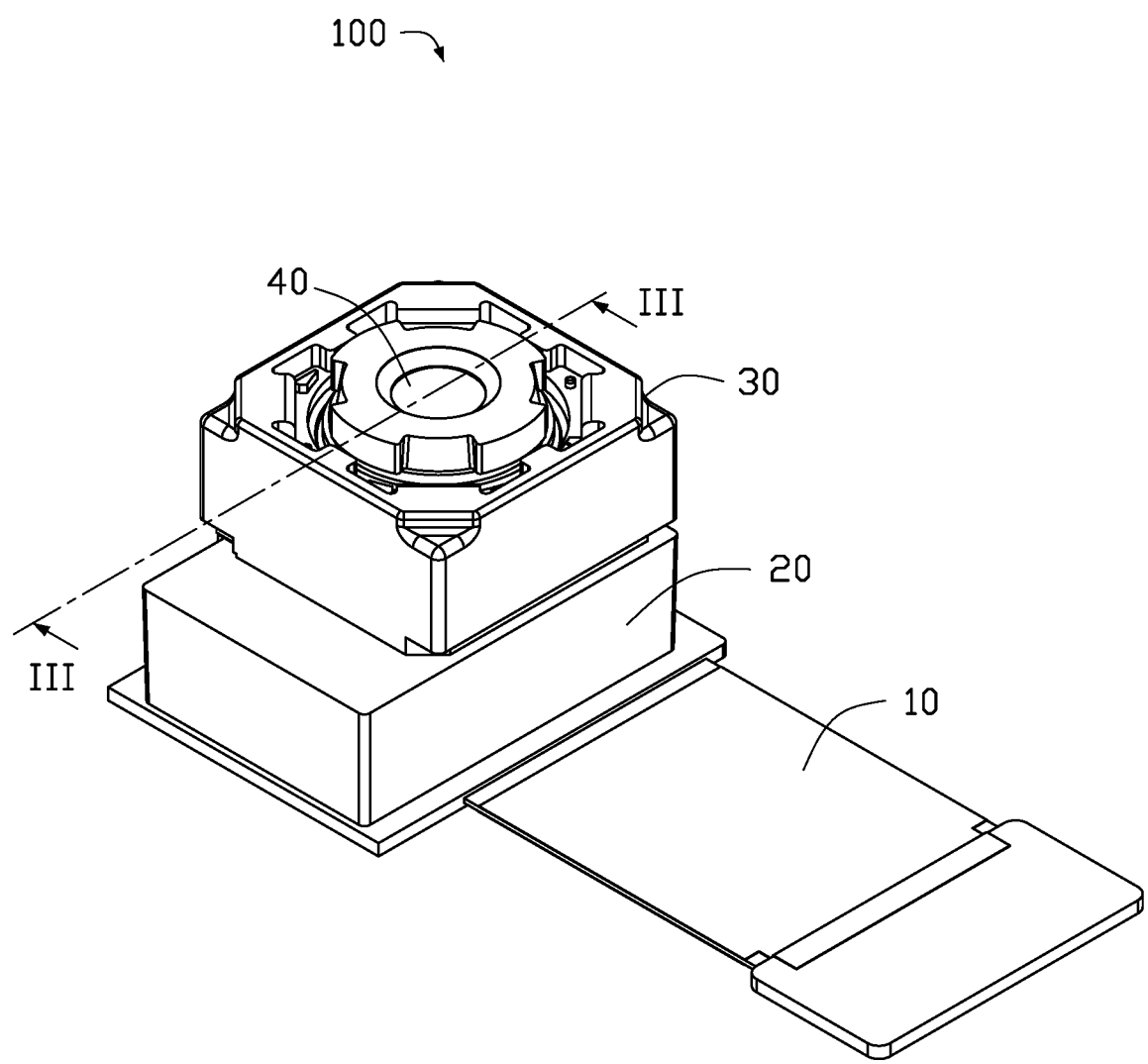
FIG. 1 is a perspective view of a first embodiment of a lens module, according to the present disclosure.
Figure 2:
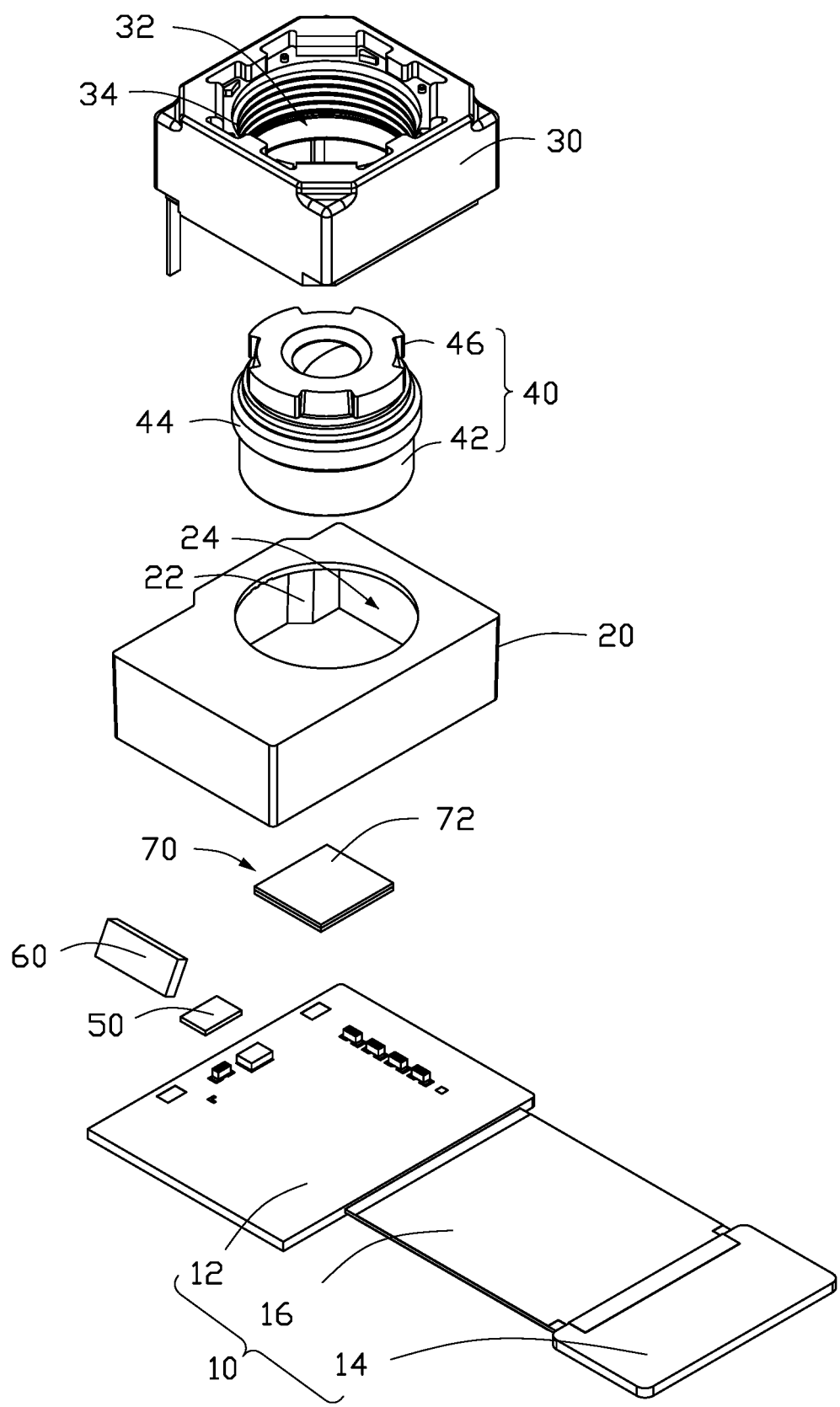
FIG. 2 is an exposed view of the lens module of FIG. 1.
Figure 3:
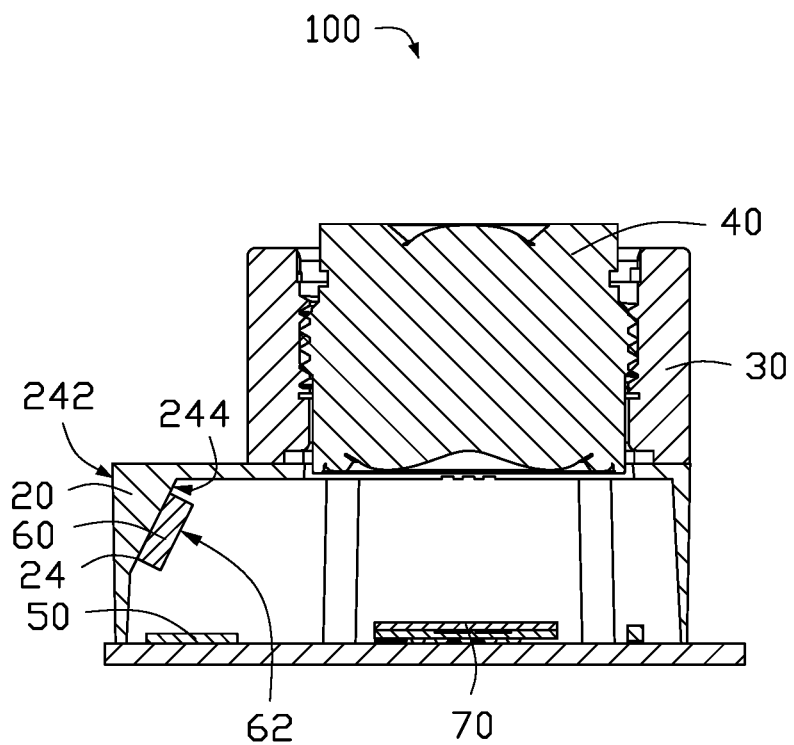
FIG. 3 is a cross-section view along line III-III of FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

FIGS. 1-4 show a lens module 100. The lens module 100 includes a printed circuit board 10, a mounting bracket 20, a voice coil motor 30, a lens 40, a light emitting element 50, a prism 60, and a digital light procession (DLP) component 70. The mounting bracket 20 is mounted on the printed circuit board 10. The voice coil motor 30 is formed on the mounting bracket 20. The lens 40 is received in the voice coil motor 30. The light emitting element 50, the prism 60, and the DLP component 70 are received in the mounting bracket 20.

The printed circuit board 10 may be a ceramic substrate, a flexible printed circuit board, a rigid printed circuit board, a rigid-flex printed circuit board, or the like. In at least one embodiment, the printed circuit board 10 is a rigid-flex printed circuit board.

In at least one embodiment, the printed circuit board 10 includes a first rigid portion 12, a second rigid portion 14, and a flexible portion 16. The flexible portion 16 is located between the first rigid portion 12 and the second rigid portion 14.

A plurality of electronic components (not shown) is electrically connected to and mounted on the first rigid portion 12. The plurality of electronic components may be one of resistors, capacitors, diodes, transistors, relays, or the like.

The mounting bracket 20 is mounted on the first rigid portion 12. In at least one embodiment, the mounting bracket 20 and the light emitting element 50 are formed on a same surface of the printed circuit board 10. The mounting bracket 20 is a hollow structure and is rectangular. A first through hole 22 is defined in the mounting bracket 20 and faces the first rigid portion 12.

The mounting bracket 20 includes at least one side wall 24. The side wall 24 includes an outer surface 242 and an inclined surface 244. In at least one embodiment, the outer surface 242 is perpendicular to the circuit board 10. The inclined surface 244 faces and inclines towards the printed circuit board 10.

The voice coil motor 30 is mounted on the mounting bracket 20. The mounting bracket 20 is between the voice coil motor 30 and the printed circuit board 10. The voice coil motor 30 is a hollow structure and is rectangular. A second through hole 32 is defined in the voice coil motor 30. The lens 40 is received in the second through hole 32. A plurality of first threads 34 are defined on an inner wall of the second through hole 32. The voice coil motor 30 is configured to captures the pattern, automatically adjust a distance between the lens 40 and the DLP component 70 according to a sharpness of the pattern, and sends electronic signals to the DLP component 70.

A portion of the lens 40 is received in the second through hole 32. The lens 40 includes a first lens portion 42 and a second lens portion 46. A plurality of second threads 44 are defined on an outer wall of the first lens portion 42. The plurality of second threads 44 meshes with the plurality of first threads 34 to connect the lens 40 and the voice coil motor 30. The first lens portion 42 is received in the second through hole 32. The second lens portion 46 protrudes out of the second through hole 32. The voice coil motor 30 can automatically adjust the distance between the lens 40 and the DLP component 70 by the plurality of second threads 44 and the plurality of first threads 34.

The light emitting element 50 is electrically connected to and mounted on the first rigid portion 12. The light emitting element 50 may be a vertical cavity surface emitting laser (VESEL) or a light emitting diode (LED). The light emitting element 50 is configured to emit light.

The prism 60 is mounted on the inclined surface 244. The prism 60 includes a reflecting surface 62. The reflecting surface 62 faces the light emitting element 50. The prism 60 is configured to reflect the light emitted by the light emitting element 50 to the DLP component 70. An angle defined by the light emitted by the light emitting element 50 and the reflecting surface 62 is less than 90 degrees.

The DLP component 70 is electrically connected to and mounted on the first rigid portion 12. The DLP component 70 and the light emitting element 50 are formed on a same surface of the first rigid portion 12. The DLP component 70 cooperates with the voice coil motor 30 to present a clear pattern at different focal lengths and different needs.

The DLP component 70 includes a digital micromirror device (DMD) sensor 72. The DMD sensor 72 includes a plurality of microchips 722, one microchip 722 represents one pixel, and the microchips 722 are an ultra-small digital optical switch. The area of each of the microchip 722 is very small, about 14 μm². The plurality of microchips 722 are rectangular and are articulated mirrors made of aluminum. The plurality of microchips 722 can be rotated to change states of the plurality of microchips 722. Each of the plurality of microchips 722 has an ON state and an OFF state. When the plurality of microchips 722 is in the ON state, light is reflected into the lens 40. When the plurality of microchips 722 is in the OFF state, light is reflected out of the lens 40. The microchips 722 is configured to reflect light emitted from the prism 60 to form a pattern. When the microchips 722 receives the electronic signals from the voice coil motor 30, the DLP sensor rotates to change states of the DLP sensor according to the electronic signals, and control an amount of the lights reflected into the lens 40 according to the electronic signals thereby forming a pattern with a higher degree of sharpness than the pattern previously captured.

Figure 4:
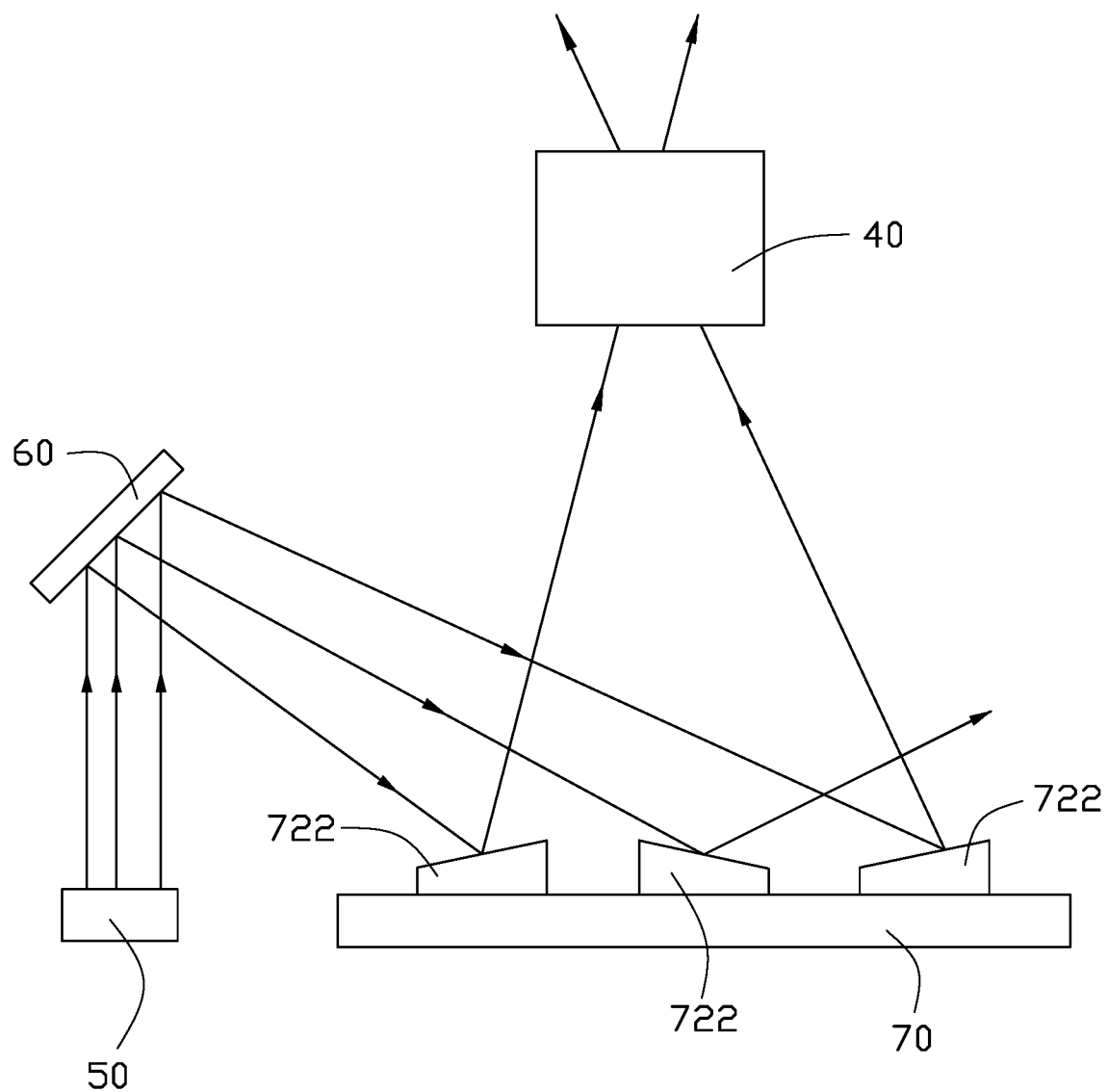
FIG. 4 illustrated a light path view of lights emitted from a light-emitting element.

Referring to FIG. 4, the light emitting element 50 emits lights, the lights shot onto the reflecting surface 62 of the prism 60 and reflected by the reflecting surface 62 of the prism 60 to the DLP component 70. A portion of the lights from the prism 60 is reflected into the lens 40 to form a pattern and reflect the lights with the pattern onto the lens 40. The lights with the pattern travel through the lens 40 and is presented onto an object. The voice coil motor 30 captures the pattern, automatically adjust the distance between the lens 40 and the DLP component 70 according to the sharpness of the pattern, and sends electronic signals to the DLP component 70. The microchips 722 receives the electronic signals, rotates to change states of the microchips 722 according to the electronic signals to control an amount of the lights reflected into the lens 40 to make the pattern become clear, and reflects the lights to the lens 40.

Figure 5:
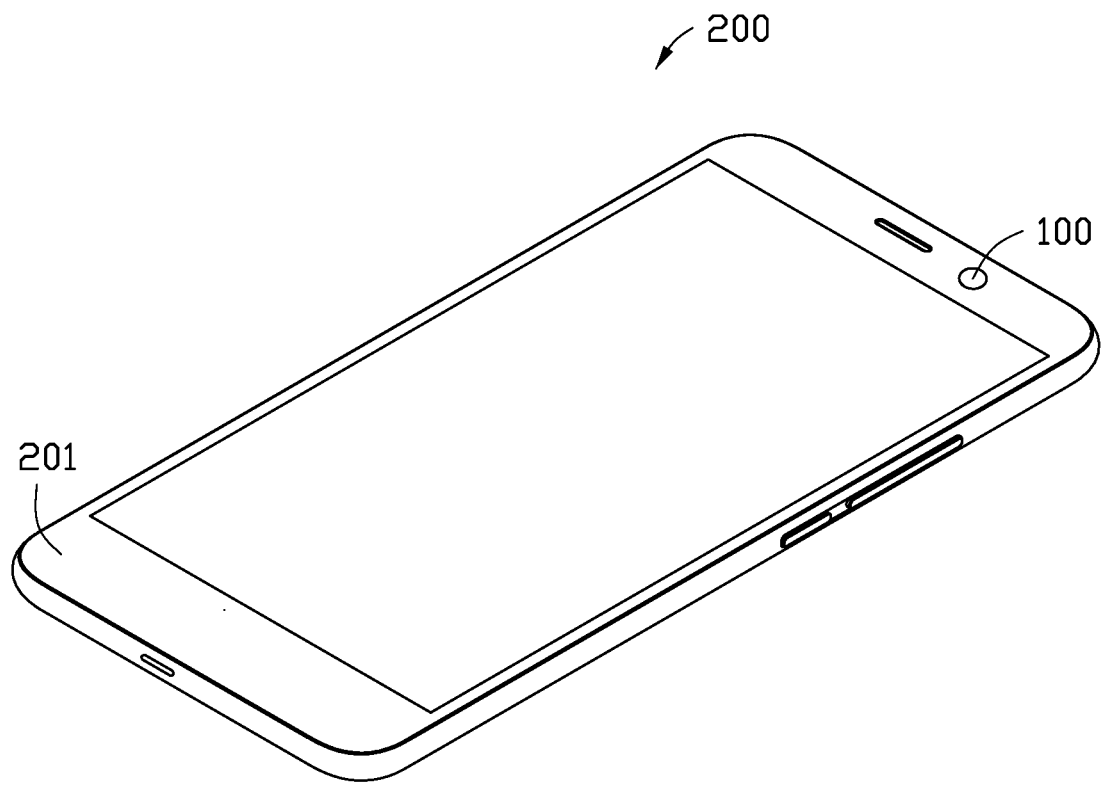
FIG. 5 is a perspective view of an electrical device including the lens module of FIG. 1.

Referring to FIG. 5, the lens module 100 can be installed in an electronic device 200. The electronic device 200 may be a smart phone, a tablet computer, a wearable device, a vehicles, monitoring device, or the like. The electronic device 200 includes a main body 201 and the lens module 100 mounted in the main body 201. In at least one embodiment, the electronic device 200 is a smart phone.

With the embodiments described above, the lens module 100 includes a light emitting element 50, a prism 60, and a DLP component 70, user can reflect lights from the prim 60 and control the amount of the lights reflected into the lens 40 according to electronic signals from the voice coil motor 30 to form a pattern and make the pattern become clear. The lens module 100 has a better flexibility and applicability.

The embodiments shown and described above are only examples. Many details are often found in the art such as the other features of a lens module. Therefore, many such details are neither shown nor described. Even though numerous characteristics and advantages of the present disclosure have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A lens module comprising:
   a voice coil motor;
   a lens, wherein the lens is received in the voice coil motor;
   a light emitting element, wherein the light emitting element is adapted for emitting lights;
   a prism; wherein the prism faces and is inclined towards the light emitting element;
   a digital light procession (DLP) sensor; wherein the DLP sensor faces the lens; the prism is configured to reflect the lights from the light emitting element to the DLP sensor; the DLP sensor reflects a portion of lights from the prism to form a pattern; the voice coil motor is configured to automatically adjust a distance between the lens and the DLP sensor according to a sharpness of the pattern and send electronic signals to the DLP sensor; when the DLP sensor receives the electronic signals, the DLP sensor rotates to change states of the DLP sensor according to the electronic signals and control an amount of the lights reflected into the lens according to the electronic signals thereby forming a pattern with a higher degree of sharpness than the pattern previously captured;
   a mounting bracket wherein the voice coil motor is formed on the mounting bracket the light emitting element, the prism, the DLP sensor are received in the mounting bracket.

2. The lens module of claim 1, wherein the mounting bracket comprises an inclined surface which faces and is inclined towards the light emitting element, the prism is formed on the inclined surface, the prism comprises a reflecting surface facing the light emitting element, an angle defined by the light emitted by the light emitting element and the reflecting surface is less than 90 degrees.

3. The lens module of claim 1, wherein the lens module further comprises a printed circuit board, the mounting bracket is mounted on the printed circuit board, each of the light emitting element and the DLP sensor is electrically connected to and mounted on the printed circuit board.

4. The lens module of claim 3, wherein the light emitting element and the DLP sensor are mounted on a same surface of the printed circuit board.

5. The lens module of claim 1, wherein the light emitting element is a vertical cavity surface emitting laser or a light emitting diode.

6. The lens module of claim 1, wherein the DLP component comprises a digital micromirror device (DMD) sensor, and the DMD sensor comprises a plurality of microchips, the plurality of microchips reflects light emitted from the prism to the lens.

7. The lens module of claim 6, wherein each of the plurality of microchips has an ON state and an OFF state; when the microchips is in the ON state, light is reflected into the lens; when the microchips is in the OFF state, light is reflected out of the lens.

8. The lens module of claim 7, wherein the plurality of microchips changes between the ON states and the OFF state by rotating the microchips.

9. The lens module of claim 1, wherein a second through hole is defined in the voice coil motor, the lens is received in the second through hole; a plurality of first threads are defined on an inner wall of the second through hole; a plurality of second threads are defined on an outer wall of the lens; the plurality of second threads meshes with the plurality of first threads.

10. An electronic device, comprising
a main body;
a lens module mounted in the main body, the lens module comprising:
  a voice coil motor;
  a lens, wherein the lens is received in the voice coil motor;
  a light emitting element, wherein the light emitting element is adapted for emitting lights;
  a prism; wherein the prism faces and is inclined towards the light emitting element;
  a digital light procession (DLP) sensor; wherein the DLP sensor faces the lens; the prism is configured to reflect the lights from the light emitting element to the DLP sensor; the DLP sensor reflects a portion of lights from the prism to form a pattern; the voice coil motor is configured to automatically adjust the distance between the lens and the DLP sensor according to a sharpness of the pattern, and sends electronic signals to the DLP sensor; when the DLP sensor receives the electronic signals, the DLP sensor rotates to change states of the DLP sensor according to the electronic signals and control an amount of the lights reflected into the lens according to the electronic signals thereby forming a pattern with a higher degree of sharpness than the pattern previously captured;
  a mounting bracket wherein the voice coil motor is formed on the mounting bracket the light emitting element, the prism, the DLP sensor are received in the mounting bracket.

11. The electronic device of claim 10, wherein the mounting bracket includes an inclined surface which faces and is inclined towards the light emitting element, the prism is formed on the inclined surface, the prism comprises a reflecting surface facing the light emitting element, an angle defined by the light emitted by the light emitting element and the reflecting surface is less than 90 degrees.

12. The electronic device of claim 10, wherein the lens module further comprises a printed circuit board, the mounting bracket is mounted on the printed circuit board, each of the light emitting element and the DLP sensor is electrically connected to and mounted on the printed circuit board.

13. The electronic device of claim 12, wherein the light emitting element and the DLP sensor are mounted on a same surface of the printed circuit board.

14. The electronic device of claim 10, wherein the light emitting element is at least one of a vertical cavity surface emitting laser or a light emitting diode.

15. The electronic device of claim 10, wherein the DLP component comprises a digital micromirror device (DMD) sensor, and the DMD sensor comprises a plurality of microchips, the plurality of microchips reflects the light emitted from the prism to the lens.

16. The electronic device of claim 15, wherein each of the plurality of microchips has two states: an ON state and an OFF state; when the microchips is in the ON state, light is reflected into the lens; when the microchips is in the OFF state, light is reflected out of the lens.

17. The electronic device of claim 16, wherein the plurality of microchips changes between the ON states and the OFF state by rotating the microchips.

18. The electronic device of claim 10, wherein a second through hole is defined in the voice coil motor, the lens is received in the second through hole; a plurality of first threads are defined on an inner wall of the second through hole; a plurality of second threads are defined on an outer wall of the lens; the plurality of second threads meshes with the plurality of first threads.

* * * * *